(12) United States Patent
Alappat

(10) Patent No.: US 6,876,102 B2
(45) Date of Patent: Apr. 5, 2005

(54) DIODE FAULT DETECTION SYSTEM AND METHOD

(75) Inventor: Kuriappan P. Alappat, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 243 days.

(21) Appl. No.: 10/205,140

(22) Filed: Jul. 24, 2002

(65) Prior Publication Data

US 2004/0017642 A1 Jan. 29, 2004

(51) Int. Cl.$^7$ ................................................. H02J 1/10
(52) U.S. Cl. ........................................................ 307/18
(58) Field of Search ............................... 307/18, 43–44; 323/269, 272, 767; 340/635, 645, 650–652, 660–661; 361/18

(56) References Cited

U.S. PATENT DOCUMENTS 6,157,308 A  12/2000  Byers

OTHER PUBLICATIONS

White Paper "Power Connection for PICMG 3.0 (Version 4)," Istvan Vadasz, Jan. 28, 2002.

*Primary Examiner*—Stephen W. Jackson
*Assistant Examiner*—Boris Benenson
(74) *Attorney, Agent, or Firm*—Blakely, Sokoloff, Taylor & Zafman LLP

(57) ABSTRACT

Disclosed are a system and method of detecting a diode fault among diodes coupled to a plurality of redundant power feeds. A diode short fault may be detected by measuring a first voltage across a first one of the diodes, measuring a second voltage between two nodes including a terminal of the first diode and detecting the diode short based upon the first and second voltages. A diode open fault may be detected by decoupling a first one of the diodes from a power feed and measuring the voltage across the diode.

32 Claims, 4 Drawing Sheets

DIODE FAULT DETECTION SYSTEM AND METHOD

BACKGROUND

1. Field

The subject matter disclosed herein relates to high availability processing platforms. In particular, the subject matter disclosed herein relates to detecting faults in high availability processing platforms.

2. Information

Telecommunication processing and enterprise data center processing systems are typically designed to meet requirements of high availability of resources. For example, such systems typically comprise redundant resources to meet certain requirements of fault tolerance. Processing resources are typically provided in rack mounted enclosures to enable convenient servicing or replacement of subsystems. Such rack mounted enclosures also typically comprise front panel displays enabling a system operator to visually observe status indications.

A high availability platform typically receives redundant power sources such that the platform will not fail if one of the power sources fails. Such redundant power sources typically provide a plurality of power feeds to components or subsystems through a backplane, baseboard or motherboard.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Figure 1:
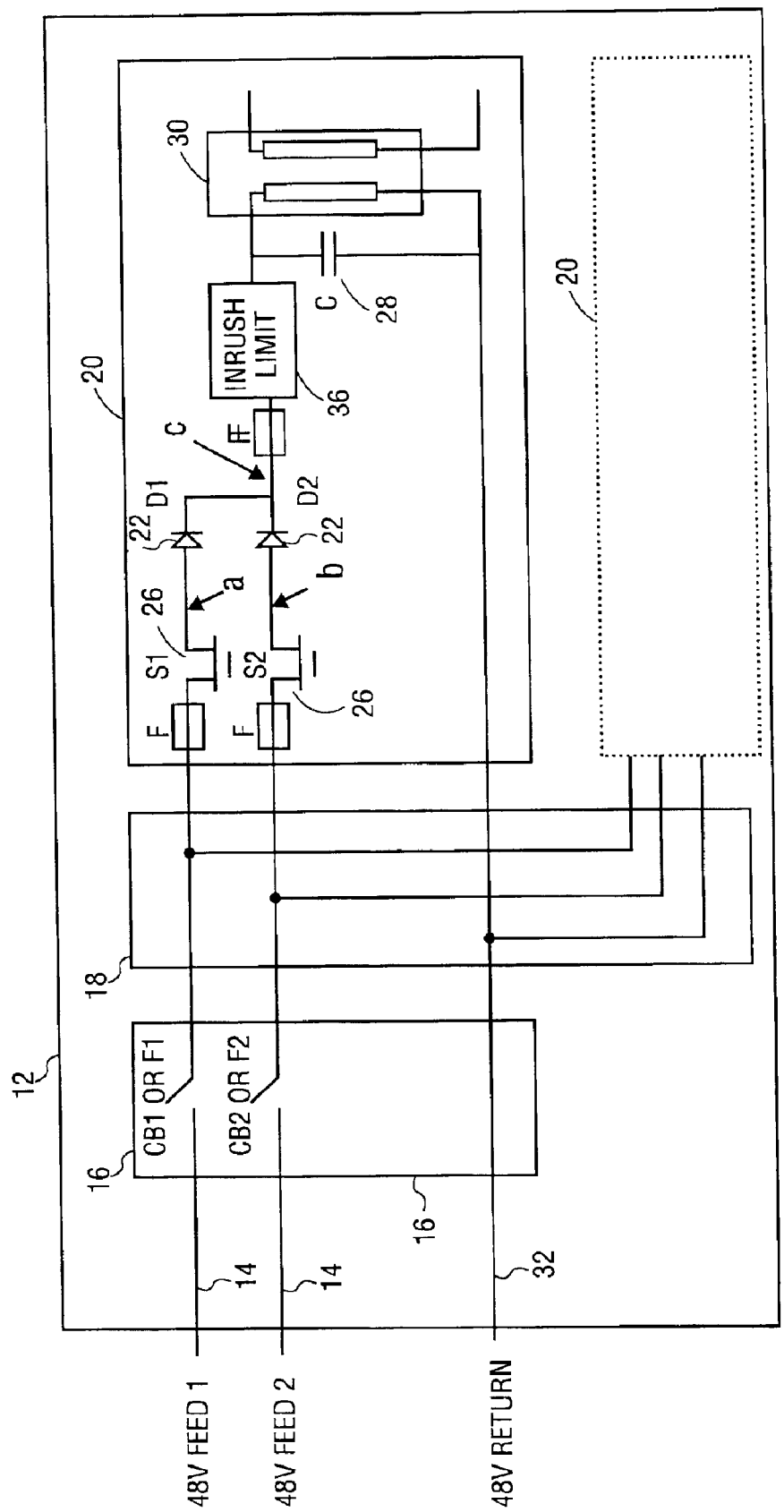
FIG. 1 shows a diagram illustrating a component chassis adapted to receive a plurality of redundant power feeds according to an embodiment of the present invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relates to expressions which may be understood by one or more machines for performing one or more logical operations. For example, machine-readable instructions may comprise instructions which are interpretable by a processor compiler for executing one or more operations on one or more data objects. However, this is merely an example of machine-readable instructions and embodiments of the present invention are not limited in this respect.

"Machine-readable medium" as referred to herein relates to media capable of maintaining expressions which are perceivable by one or more machines. For example, a machine readable medium may comprise one or more storage devices for storing machine-readable instructions or data. Such storage devices may comprise storage media such as, for example, optical, magnetic or semiconductor storage media. However, this is merely an example of a machine-readable medium and embodiments of the present invention are not limited in this respect.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structure which may provide logic and embodiments of the present invention are not limited in this respect.

A "backplane" as referred to herein relates to a system level circuit board that is capable of being coupled to one or more subsystem level circuit boards. For example, a backplane may comprise one or more sockets as "backplane interfaces" for integrating subsystem circuit boards or expansion cards with other circuitry disposed on or coupled to the backplane. However, these are merely examples of a backplane and backplane interface, and embodiments of the present invention are not limited in these respects.

A "plug-in-unit" (PIU) as referred to herein relates to an electronic subsystem module which is adapted to be plugged into a socket of a larger system. For example, PIU may be adapted to be plugged into a backplane disposed within a component chassis. Such a backplane may transport power to the PIU and couple the PIU to other subsystems. However, this is merely an example of a PIU and embodiments of the present invention are not limited in this respects.

A "diode" as referred to herein relates to an electronic device enabling a forward electrical current to flow from a first terminal to a second terminal but preventing a reverse electrical current flowing from the second terminal to the first terminal. Accordingly, the diode may act as a "closed circuit" in response to the forward electrical current and act as an "open circuit" in response to the reverse electrical current. In one embodiment, the physical characteristics and operating environment of diode may prevent (or at least impede) the forward electrical current from flowing from the first terminal to the second terminal until a voltage between the first and second terminals exceeds a threshold "diode turn-on" voltage. However, these are merely examples of a diode and a diode turn-on voltage, and embodiments of the present invention are not limited in these respects.

In the course of operation, a diode may incur a "diode open" failure or fault characterized by the diode substantially providing an open circuit in response to current flowing in either direction between first and second terminals of the diode. A diode may also incur a "diode short" failure or fault characterized by the diode substantially providing a short circuit in response to current flowing in either direction between first and second terminals of the diode. However, these are merely examples of a diode open and diode short failures, and embodiments of the present invention are not limited in these respects.

A "power feed" as referred to herein relates to a source to provide electrical power to an electronic system. For example, one or more subsystems disposed within a component chassis may externally receive a power feed. Also, a power feed may be coupled to a backplane to transport the power feed to one or more subsystems coupled to the backplane. However, these are merely examples of a power feed and embodiments of the present invention are not limited in these respects.

An electronic system may receive a plurality of "redundant power feeds" such that the electronic system is capable of at least partial operation in an event that one of the redundant power feeds fails. However, this is merely an example of redundant power feeds and embodiments of the present invention are not limited in this respect.

Briefly, embodiments of the present invention relate to a system and method of detecting a diode fault among diodes coupled to a plurality of redundant power feeds received at equipment. A diode short fault may be detected by measuring a first voltage across a first one of the diodes, measuring a second voltage between two nodes including a terminal of the first diode and detecting the diode short based upon the first and second voltages. A diode open fault may be detected by decoupling a first one of the diodes from a power feed and measuring a voltage. However, these are merely example embodiments and other embodiments are not limited in these respects.

FIG. 1 shows a diagram of a component chassis 12 adapted to receive a plurality of redundant power feeds 14 according to an embodiment of the present invention. The component chassis 12 may house any one of several types of high availability processing platforms such as, for example, modular telecommunication processing platforms, enterprise servers, data storage platforms and network data switches. However, these are merely examples of high availability processing platforms and embodiments of the present invention are not limited in these respects.

The component chassis 12 comprises a backplane 18 which is adapted to receive a power entry module (PEM) 16 and one or more plug-in-units (PIUs) 20. The PEM 16 is adapted to couple the power feeds 14 to circuitry on the backplane 18. The PEM 16 may also comprise over-current protection devices such as circuit breakers CB1 and CB2, or fuses F1 and F2 for coupling power from the redundant power feeds 14 to the backplane 18. The backplane 18 may comprise circuitry to transport power from the power feeds 14 to the PIUs 20 including, for example, sockets to receive the PEM 16 and PIU 20s, and a printed circuit board coupling the sockets with circuit traces. Fuses F and a current rush limiter 36 may prevent power feed current overloads at the backplane 18 during electrical short on the board and during board insertion. While the embodiment of FIG. 1 shows power being provided to one or more PIUs 20, it should be understood that in other embodiments redundant power feeds may be provided to non-modular equipment (e.g., stand alone equipment) independently of an intermediary backplane. Also, while the embodiment of FIG. 1 shows two redundant power feeds 14, it should be understood that other embodiments may provide three or more redundant power feeds to a PIU through a backplane or non-modular equipment directly. While the embodiment of FIG. 1 shows that one or more PIUs 20 may receive power feeds 14 from a single PEM 16, it should be understood that in other embodiments each PIU may receive one or power feeds from multiple, redundant PEMs such that if a single PEM fails, each PIU may still receive a power feed from a remaining PEM.

For each redundant power feed 14, a PIU 20 may comprise a corresponding biased diode 22 coupled to the power feed 14 by a switch 26. The diodes 22 are coupled at first terminals to a common node "c." Each of the diodes 22 comprises a second terminal coupled to a switch 26 to selectively couple or decouple the diode 22 from an associated power feed 14.

In the presently illustrated embodiment, each diode 22 may be biased to permit current to flow from the associated power feed 14 to a corresponding PIU 20 and prevent current from flowing from Feed 2 to Feed 1 of the power feeds 14. Accordingly, the diode 22 acts substantially as an open circuit in response to current flowing from Feed 2 to Feed 1, or Feed 1 to Feed 2 of the power feeds 14. A diode failure or fault may occur in which a diode 22 is short (permitting current to flow between the Feed 1 and Feed 2 of the power feeds 14) or open (inhibiting current from flowing between the power feed 14 and the corresponding PIU 20 in either direction). While the diodes 22 are shown biased to permit current flowing in one direction in the power feed 14, it should be understood that in other embodiments that the diodes 22 may be biased to permit current to flow in an opposite direction in the power feeds to support negative feed voltages.

Figure 2:
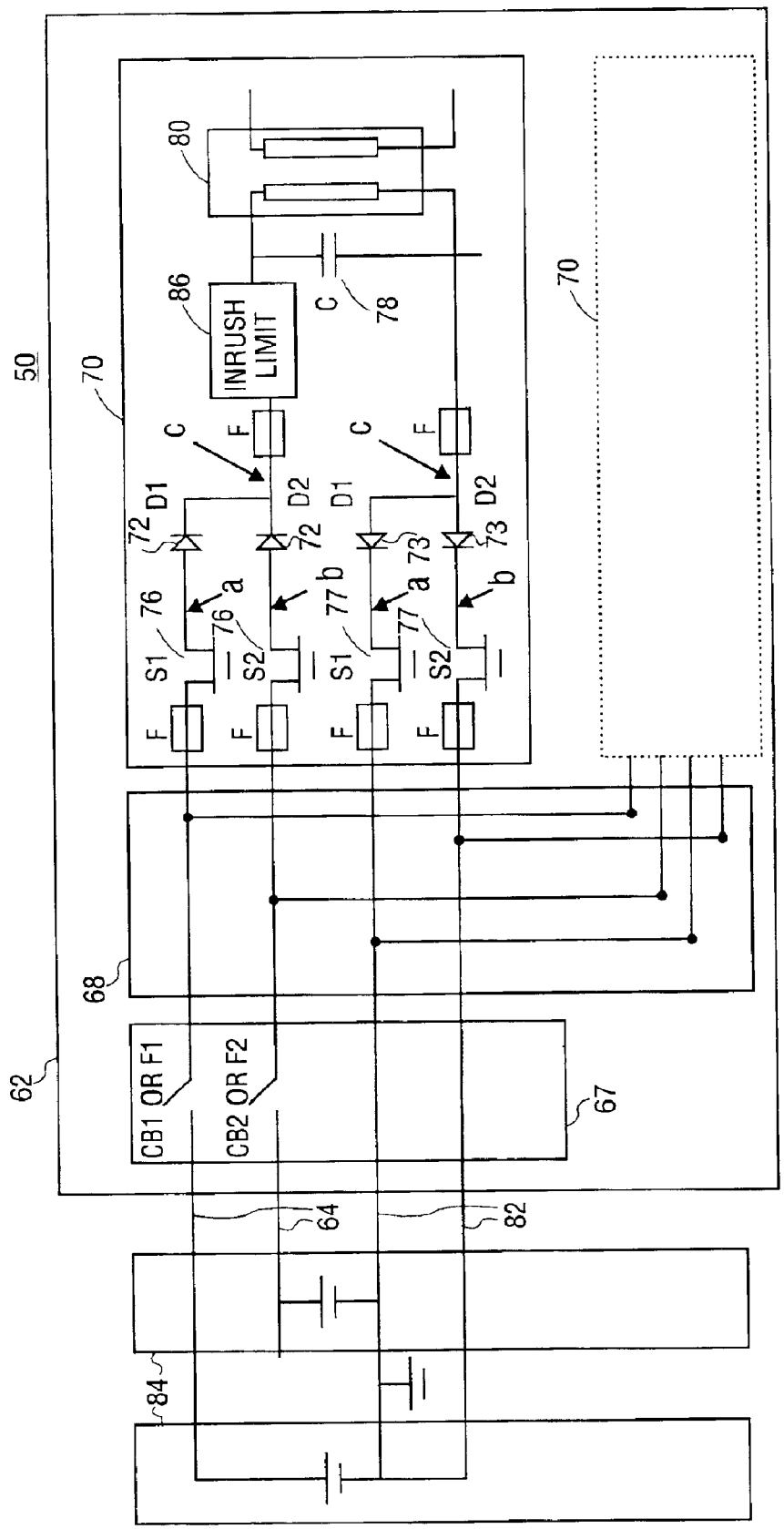
FIG. 2 shows a diagram of a component chassis adapted to receive a plurality of redundant power feeds according to an alternative embodiment of the present invention.

FIG. 2 shows a diagram of a component chassis 62 adapted to receive a plurality of redundant power feeds 64 according to an alternative embodiment of the present invention. The component chassis 62 comprises a PEM 67 which is adapted to receive the redundant power feeds 64. A backplane 68 may be adapted to receive one or more PIUs 70. The PEM 67 may comprise over current protection circuitry such as circuit breakers CB1 and CB2, or fuses F1 and F2 for coupling power from the redundant power feeds 64 to the backplane 68. The backplane 68 may comprise circuitry to transport power from the power feeds 64 to PIUs 70 including, for example, sockets to receive the PIUs 20, and a printed circuit board coupling the sockets with circuit traces. While the embodiment of FIG. 1 shows power being provided to one or more PIUs 70, it should be understood that in other embodiments redundant power feeds may be provided to non-modular equipment (e.g., stand alone equipment) independently of an intermediary backplane. While the embodiment of FIG. 2 shows two redundant power feeds 64, it should be understood that other embodiments may provide three or more redundant power feeds to a PIU through a backplane, or non-modular equipment. While the embodiment of FIG. 2 shows that one or more PIUs 70 may receive power feeds 64 from a single PEM 67, it should be understood that in other embodiments each PIU may receive one or power feeds from multiple, redundant PEMs such that if a single PEM fails, each PIU may still receive a power feed from a remaining PEM.

For each redundant power feed 64, a PIU 70 may comprise a corresponding biased diode 72 coupled to the power feed 64 by a switch 76. The diodes 72 are coupled at first terminals to a common node "c." Each of the diodes 72 comprises a second terminal coupled to a switch 76 to selectively couple or decouple the diode 72 from an associated power feed 64. In the presently illustrated embodiment, for each power feed return 82, a PIU 70 may also comprise a biased diode 73 coupled to each power feed return 82 by a switch 77. The diodes 73 are also coupled at first terminals to a common node "c."

In the presently illustrated embodiment, each diode 72 may be biased to permit current to flow from the associated power feed 64 to a corresponding PIU 70 and prevent current from flowing from the corresponding PIU 70 to the power feed 64. Accordingly, the diode 72 may act substantially as a short circuit in response to current flowing from the power feed 64 to the corresponding PIU 70 and may act substantially as an open circuit in response to current flowing from the PIU 70 to the power feed 64. A diode failure or fault may occur in which a diode 72 is short (permitting current to flow between the power feed 64 and the corresponding) or open (inhibiting current from flowing between the power feed 64 and the corresponding PIU 70 in either direction).

Also, each diode 73 may be biased to permit return current to flow from a corresponding PIU 70 to an associated power feed return 82 and prevent current flowing form the power feed return 82 to the PIU 70. Accordingly, the diode 73 may act substantially as a short circuit in response to current flowing from the corresponding PIU 70 to the power feed return 82 and may act substantially as an open circuit in response to current flowing from the power feed return 82 to the corresponding PIU 70. A diode failure or fault may occur in which a diode 73 is short (permitting current to flow between the power feed return 82 and the corresponding PIU 70) or open (inhibiting current from flowing between the power feed return 82 and the corresponding PIU 70 in either direction). While FIG. 2 shows the diodes 72 as being biased to permit current flowing in one direction in the power feeds 64 and the diodes 73 as being biased to permit current flowing in another direction in the return feeds 82, it should be understood that in other embodiments that the diodes 72 and 73 may be biased to permit current to flow in opposite directions.

According to the embodiments of either FIG. 1 or FIG. 2, a diode fault detection system (not shown) may be disposed within a chassis (e.g., chassis 12 or 62) to detect diode open or short faults with respect to one or more of the diodes 22, 72 or 73. Such a diode fault detection system may be employed as part of a management controller which executes a diagnostic procedure to detect such an open or short fault, and provide an alert signal to indicate such a condition to allow a system operator to replace a PIU 20 before a failure of the other redundant diode(s). In response to the alert signal, for example, a shelf manager entity may illuminate a display (e.g., comprising LEDs or LCDs on a rack mounted display) or transmit an external alert signal. However, these are merely examples of how a shelf manager may respond to a diode fault detection alert from a management controller and embodiments of the present invention are not limited in these respects.

The diode fault detection system may comprise voltage sensors (not shown) coupled to nodes a, b and c, and control circuitry to selectively open or close switches (e.g., switches 26 in FIG. 1, or switches 76 or 77 in FIG. 2) during the diagnostic procedure. According to an embodiment, the switches 26, 76 or 77 may be electronic switches which may be opened or closed in response to a control signal from the diode fault detection system. Logic in the diode fault detection system may comprise any suitable structure for controlling the switches 26, 76 or 77 and detecting diode faults from voltage measurements including, for example, a field programmable gate array (FPGA) device, application specific integrated circuit (ASIC) or programmable controller to execute machine-readable instructions from a storage medium. However, these are merely examples of logic which may provide a diode fault detection system and embodiments of the present invention are not limited in these respects.

Figure 3:
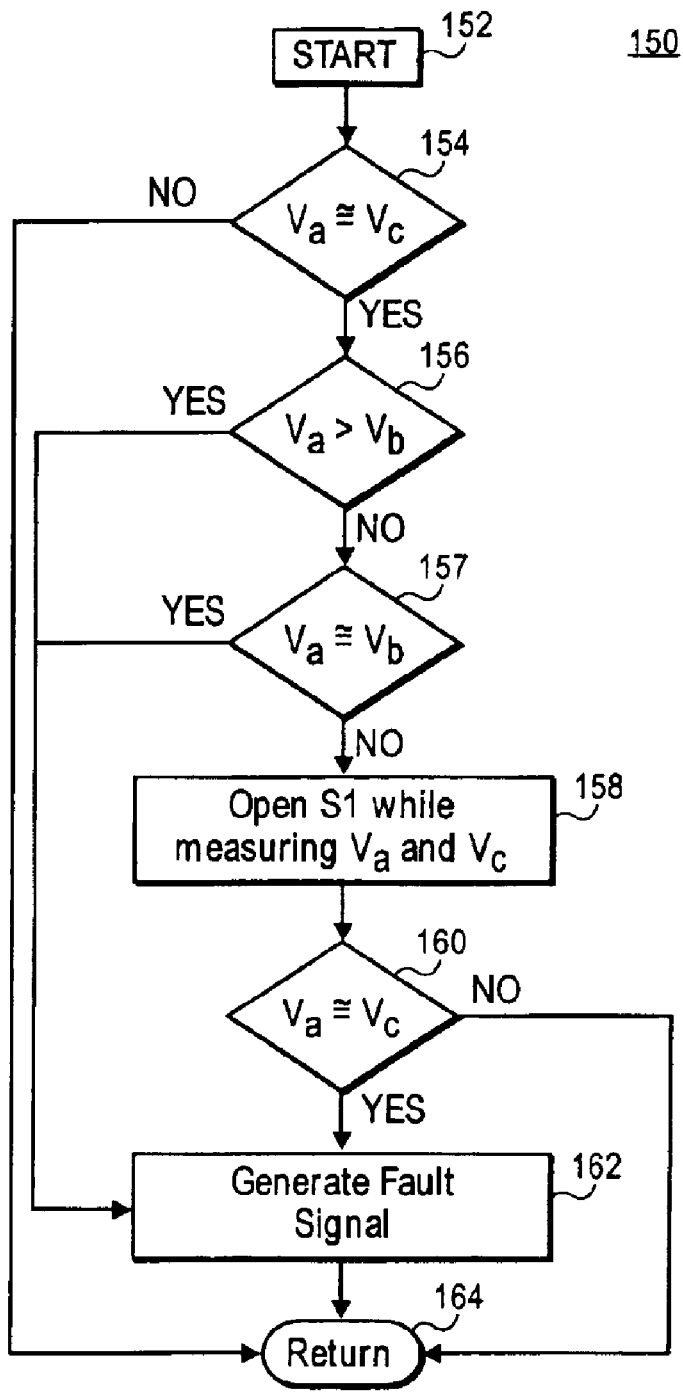
FIG. 3 shows a flow diagram illustrating a process to detect a diode short fault according to embodiments of the present invention as illustrated in either FIG. 1 or FIG. 2.
Figure 4:
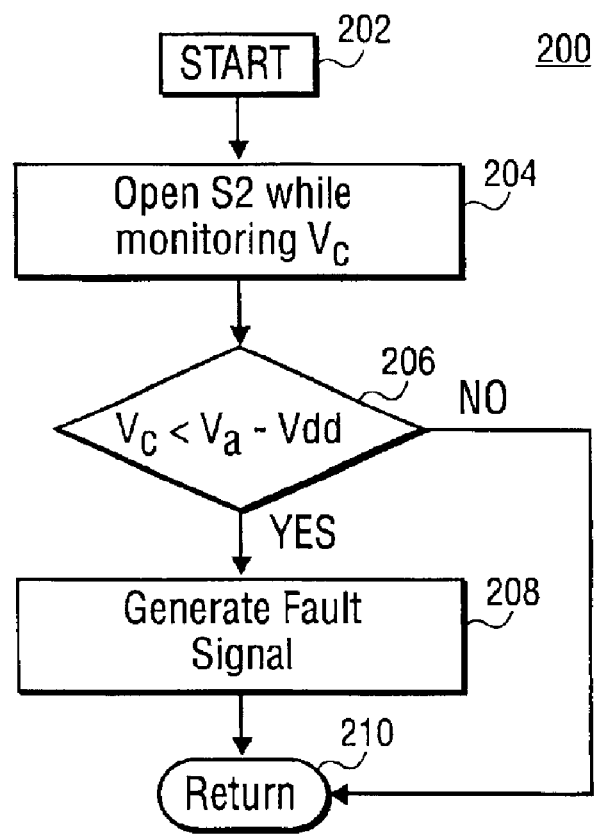
FIG. 4 shows a flow diagram illustrating a process to detect a diode open fault according to embodiments of the present invention as illustrated in either FIG. 1 or FIG. 2.

FIGS. 3 and 4 each illustrate a process to detect a diode fault in a diode labeled "D1" (e.g., a diode 22, 72 or 73 labeled D1). It should be understood, however, that a similar processes may be executed for detecting a diode short fault in a diode 22 labeled "D2." Also, in an embodiment, a process to detect diode faults may be executed for each diode in response to a diagnostic cycle controlled by a management controller. Accordingly, in response to such a diagnostic cycle, processes to detect a diode short fault or a diode open fault may be executed for each diode 22 or 72 coupled to a power feed 14 or 64, or each diode 73 coupled to a power feed return 82.

FIG. 3 shows a flow diagram illustrating a process 150 to detect a diode short fault executed by a diode fault detection system according to an embodiment of the present invention as illustrated in FIG. 1. The process 150 may be used in identifying diode short faults in diodes among any pair of diodes D1 and D2 (e.g., a pair of diodes 22, 72 or 73). Upon initiation of the process 150 at block 152, the switches coupled to the diodes D1 and D2 (e.g., switches 26, 76 or 77) are closed and voltages are measured at nodes "a" and "c" to provide voltages $V_a$ and $V_c$, respectively, indicating a voltage across a diode labeled "D1."

If $V_a$ and $V_c$ are not approximately equal, as indicated at diamond 154, no diode short fault is detected and the process terminates at block 164. If $V_a$ exceeds a voltage $V_b$ measured at node "b" (at diamond 156) or $V_a$ is approximately equal to $V_b$ (at diamond 157), then a diode short fault is detected and a short fault detection signal is provided at block 162. Otherwise, the diode fault detection system may maintain the switch coupled to diode D1 labeled "S1" in an open state while re-measuring the voltages $V_a$ and $V_c$ at nodes "a" and "c" (at block 158). If the re-measured voltages $V_a$ and $V_c$ are approximately equal at diamond 160, the diode fault detection system generates a diode fault signal at block 162.

FIG. 4 shows a flow diagram illustrating a process 200 to detect a diode open fault executed by a diode fault detection system according to an embodiment of the present invention as illustrated in FIG. 1. The process 200 may be used in identifying diode open faults in diodes among any pair of diodes D1 and D2 (e.g., a pair of diodes 22, 72 or 73). Upon initiation of the process 200 at block 202, the diode fault detection system may open a switch coupled to diode D2 labeled "S2" and measure voltages $V_a$ and $V_c$ at nodes "a" and "c" to determine a voltage across the diode D1. At diamond 206, if $V_a$ exceeds $V_c$ by more than a diode turn-on voltage $V_{dd}$ associated with the diode D1, the diode fault detection system generates a diode fault signal at block 208.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method of detecting a diode fault comprising:
   coupling each of a plurality of redundant power feeds to circuitry in equipment through a corresponding one of a plurality of diodes;
   measuring a first voltage across a first one of said diodes;
   measuring a second voltage between a terminal of the first diode and a terminal of a second diode of said plurality of diodes; and
   detecting a diode short fault based upon the first and second voltages.

2. The method of claim 1, wherein measuring the second voltage further comprises:
   decoupling the first diode from a power feed; and
   re-measuring the voltage across the first diode.

3. The method of claim 1, wherein the second diode is coupled in parallel to the first diode at a common node.

4. The method of claim 1, the method further comprising
   decoupling a diode from a power feed;
   measuring a voltage across the decoupled diode; and
   detecting a diode open fault in response to the measured voltage across the decoupled diode.

5. The method of claim 1, wherein the equipment comprises one or mere plug-in units.

6. The method of claim 1, wherein the equipment comprises non-modular equipment.

7. A method of detecting a diode fault comprising:
   coupling each of a plurality of redundant power feeds to circuitry in equipment through a corresponding one of a plurality of diodes;
   decoupling a first one of said plurality of diodes from a power feed;
   measuring a voltage across the first diode; and
   detecting a diode open fault based upon the voltage measured across the diode.

8. The method of claim 7, wherein detecting a diode open further comprises detecting the diode open fault in response to detecting a voltage difference approximately equal to or greater than a diode turn-on voltage.

9. A system comprising:
   a component chassis adapted to receive a plurality of redundant power feeds;
   equipment disposed within the component chassis, the equipment comprising a plurality of diodes, each diode coupled to one of said redundant power feeds; and
   a diode fault detection subsystem comprising:
      logic to measure a first voltage across a first one of said diodes;
      logic to measure a second voltage between a terminal of the first diode and a terminal of a second diode of said plurality of diodes; and
      logic to detect a diode short fault based upon the first and second voltages.

10. The system of claim 9, wherein the logic to measure the second voltage further comprises:
    a switch to decouple the first diode from a power feed; and
    logic to re-measure the voltage across the first diode.

11. The system of claim 9, wherein the second diode is coupled in parallel to the first diode at a common node.

12. The system of claim 9, wherein the diode fault detection subsystem further comprises logic to detect a diode open in response to detecting a voltage difference approximately equal to or greater than a diode turn-on voltage.

13. The system of claim 9, wherein the diode fault detection subsystem further comprises diode open detection logic including a switch to decouple the first diode from a power feed and logic to measure a voltage across the decoupled diode.

14. The system of claim 9, wherein the equipment comprises one or more plug-in units.

15. The system of claim 9, wherein the equipment comprises non-modular equipment.

16. A system comprising:
    a component chassis adapted to receive a plurality of redundant power feeds;
    equipment disposed within the component chassis, the equipment comprising a plurality of diodes, each diode coupled to one of said redundant power feeds; and
    a diode fault detection subsystem comprising:
       a switch to decouple a diode from a power feed; and
       logic to measure a voltage across the decoupled diode to detect a diode open fault.

17. The system of claim 16, diode fault detection logic further including a switch to decouple the first diode from a power feed and logic to measure a voltage across the decoupled diode.

18. An apparatus comprising:
    an interface to a plurality of diodes in a plug-in-unit, each diode coupled to one of a plurality of redundant power feeds; and
    diode short detection logic comprising:
       logic to measure a first voltage across a first one of said diodes;
       logic to measure a second voltage between a terminal of the first diode and a terminal of a second diode of said plurality of diodes; and
       logic to detect the diode short based upon the first and second voltages.

19. The apparatus of claim 18, wherein the logic to measure the second voltage further comprises:
    a switch to decouple the first diode from a power feed; and
    logic to re-measure the voltage across the first diode.

20. The apparatus of claim 18, wherein the second diode is coupled in parallel to the first diode at a common node.

21. The apparatus of claim 18, wherein the apparatus further comprises logic to detect a diode open in response to detecting a voltage difference approximately equal to or greater than a diode turn-on voltage.

22. The apparatus of claim 18, the apparatus further comprising diode open detection logic including a switch to decouple the first diode from a power feed and logic to measure a voltage across the decoupled diode.

23. The apparatus of claim 18, wherein the equipment comprises one or more plug-in units.

24. The apparatus of claim 18, wherein the equipment comprises non-modular equipment.

25. An apparatus comprising:
    an interface to a plurality of diodes in equipment, each diode coupled to one of a plurality of redundant power feeds; and
    diode open detection logic including a switch to decouple the first diode from a power feed and logic to measure a voltage across the decoupled diode.

26. The apparatus of claim 25, wherein the diode open detection logic further comprises:
   a switch to decouple the first diode from a power feed; and
   logic to measure a voltage across the decoupled diode.

27. An article comprising:
   a machine-readable medium comprising machine-readable instructions stored thereon to:
      associate each of a plurality of redundant power feeds with a corresponding one of a plurality of diodes;
      measure a first voltage across a first one of said diodes;
      measure a second voltage between a terminal of the first diode and a terminal of a second diode of said plurality of diodes; and
      detect a diode short fault based upon the first and second voltages.

28. The article of claim 27, wherein machine-readable medium further comprises machine-readable instructions stored thereon to:
   initiate a decoupling of the first diode from a power feed; and
   re-measure the voltage across the decoupled first diode.

29. The article of claim 27, wherein the second diode is coupled in parallel to the first diode at a common node.

30. The article of claim 27, wherein the machine-readable medium further comprises machine-readable instructions stored thereon to:
   initiate a decoupling of a diode from a power feed;
   measure a voltage across the decoupled diode; and
   detect a diode open fault in response to the measured voltage across the decoupled diode.

31. An article comprising:
   a machine-readable medium comprising machine-readable instructions stored thereon to:
      associate each of a plurality of redundant power feeds with a corresponding one of a plurality of diodes;
      initiate a decoupling a diode from a power feed;
      measure a voltage across the decoupled diode; and
      detect a diode open fault based upon the voltage measured across the decoupled diode.

32. The article of claim 31, wherein machine-readable medium further comprises machine-readable instructions stored thereon to detect a diode open fault in response to detecting a voltage difference approximately equal to or greater than a diode turn-on voltage.

* * * * *